United States Patent
Chullino, Jr. et al.

(10) Patent No.: US 6,214,432 B1
(45) Date of Patent: Apr. 10, 2001

(54) METHOD FOR CONTROLLING THE BONDING LAYER THICKNESS IN AN OPTICAL STORAGE APPARATUS AND OPTICAL STORAGE APPARATUS RESULTING THEREFROM

(75) Inventors: David Jeffrey Chullino, Jr., Terre Haute; Robert Lowell Russell, Cloverdale, both of IN (US)

(73) Assignees: Sony Corporation,, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/324,449

(22) Filed: Jun. 2, 1999

(51) Int. Cl.[7] .................................................... B32B 3/02
(52) U.S. Cl. .................. 428/64.1; 428/64.2; 428/64.4; 428/65.2; 428/913; 430/270.11; 430/495.1; 430/945; 369/283; 156/295
(58) Field of Search .................... 428/64.1, 64.2, 428/64.4, 65.2, 913; 430/270.11, 495.1, 945; 369/283; 156/60, 295

(56) References Cited

U.S. PATENT DOCUMENTS 4,740,947 * 4/1988 Ohta ....................................... 368/286

* cited by examiner

Primary Examiner—Elizabeth Evans
(74) Attorney, Agent, or Firm—Frommer Lawrence & Haug, LLP.; William S. Frommer; Matthew K. Ryan

(57) ABSTRACT

A method for controlling the bonding layer thickness between facing surfaces of two optical discs having information areas during manufacture of an optical storage apparatus wherein a plurality of microspheres of a predetermined uniform diameter are selectively placed on a facing surface of one of the optical discs. A bonding material is placed on the facing surface of the other of the optical discs. Pressure is thereafter applied to the two optical discs to form a substantially uniform bonding layer thickness between the two optical discs upon curing of the bonding material.

23 Claims, 2 Drawing Sheets

METHOD FOR CONTROLLING THE BONDING LAYER THICKNESS IN AN OPTICAL STORAGE APPARATUS AND OPTICAL STORAGE APPARATUS RESULTING THEREFROM

FIELD OF THE INVENTION

The present invention relates to the field of optical disc manufacturing, and more particularly, relates to a method for controlling the bonding layer thickness between two optical discs forming an optical storage apparatus and the optical storage apparatus resulting therefrom. The present invention is further directed to a method of controlling the bonding layer thickness of a DVD-9 optical disc.

BACKGROUND OF THE INVENTION

In order to control the bonding layer thickness between flat panel displays, such as LCD's, microspheres have been used to set the distance between two substrates. This is important for achieving the electrical requirements of flat panels, such as contrast, speed of display, etc. Optical disc manufacturing requires similar control of bonding layer thickness, although for different reasons. The method of using microspheres has been modified as set forth herein and advantageously utilized in the manufacturing of optical discs, in order to improve the bonding layer uniformity.

Some prior solutions have used the center hole burr from the punch and die process in the optical disc manufacturing process as being about the correct thickness and have relied on this thickness. In another previous attempted solutions, a calculated mass has been used to apply pressure to the two discs as they are being bonded to obtain the correct thickness. However, these prior solutions to control the bonding layer thickness between optical discs have been found to be disadvantageous in that (1) the thickness of the bonding layer is dependent upon other processes, (2) the thickness of the bonding layer does not tend to remain consistent across the entire disc, and (3) the thickness of the bonding layer may vary across the disc with respect to the pressure applied thereto.

Moreover, in manufacturing DVD-9 optical discs, any method to control the bonding adhesive thickness must meet its lateral and parallelism requirements. A schematic representation of the lateral requirements of a DVD-9 optical disc is shown in FIG. 1. This specification for overall bonding layer thickness is set at 55±15 $\mu$m and is required because the player must be able to focus on both the top and bottom discs. In addition, the focus servo has to have the ability to move within this specification. It has been found that a thickness greater than this specification can cause errors in reading information on the disc.

The parallelism requirements of a DVD-9 disc are schematically illustrated in FIG. 2. In a DVD-9 disc, the specification for variation of the thickness of any one disc is ±10 $\mu$m. In addition, the specification for thickness differences within one revolution is ±4 $\mu$m. These specifications are required because the focus servo will not be able to respond quickly enough to compensate for greater changes. If the focus servo is not so able to respond, errors in reading information on the disc result. Furthermore, if the disc is not parallel, it will be unbalanced. As technology calls for faster players, such as 24x or 32x, this unbalance will cause the disc to wobble thereby contributing to even lower performance.

OBJECTS OF THE INVENTION

It is therefore an object of the present invention to provide a method for controlling the bonding layer thickness in an optical storage apparatus which avoids the aforementioned deficiencies of the prior art.

It is also an object of the present invention to provide a method for controlling the bonding layer thickness of a DVD disc, and more particularly, a DVD-9 disc.

It is a further object of the present invention to provide a method for controlling the bonding layer thickness in an optical storage apparatus which provides for a uniform bonding layer thickness and is relatively easy to control.

It is another object of the present invention to provide a method for controlling the bonding layer thickness of an optical storage apparatus wherein the thickness attained is not dependent on other processes.

It is yet a further object of this invention to provide a method for controlling the bonding layer thickness of an optical storage apparatus wherein the bonding thickness tends to remain consistent across the entire disc.

It is yet another object of this invention to provide a method for controlling the bonding layer thickness of an optical storage apparatus wherein the bonding layer thickness does not vary across the disc with respect to the pressure applied thereto.

It is yet still a further object of the present invention to provide a method for controlling the bonding layer thickness of an optical storage apparatus which meets the lateral and parallelism requirements of a DVD-9 bonding layer.

It is yet still another object of the present invention to provide a method for controlling the bonding layer thickness of an optical storage apparatus which retains the aesthetic qualities of the disc.

It is yet still another object of the present invention to provide an optical storage apparatus which has a uniform bonding layer thickness.

It is yet still a further object of the present invention to provide a DVD-9 disc which has a uniform bonding layer thickness.

Various other objects, advantages and features of the present invention will become readily apparent from the ensuing detailed description and the novel features will be particularly pointed out in the appended claims.

SUMMARY OF THE INVENTION

According to an aspect of the present invention, a method for controlling the bonding layer thickness between facing surfaces of two optical discs during manufacture of an optical storage apparatus is provided wherein a plurality of microspheres of a predetermined diameter are selectively placed on a facing surface of one of the two optical discs. A bonding material is placed on the facing surface of the other of the optical discs. Pressure is then applied to the two optical discs to form a substantially uniform thickness of the resulting optical storage apparatus upon curing of the bonding material.

In another aspect of the present invention, an optical storage apparatus is provided which includes two optical discs having a plurality of microspheres of uniform diameter selectively placed in a bonding layer therebetween to thereby provide a uniform thickness of the bonding layer.

The above, and other objects, features and advantages of the present invention will become apparent in the following detailed description of certain preferred embodiments which are to be read in conjunction with the accompanying drawings, and in which like reference numerals are used to identified the same or similar parts in the several views.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
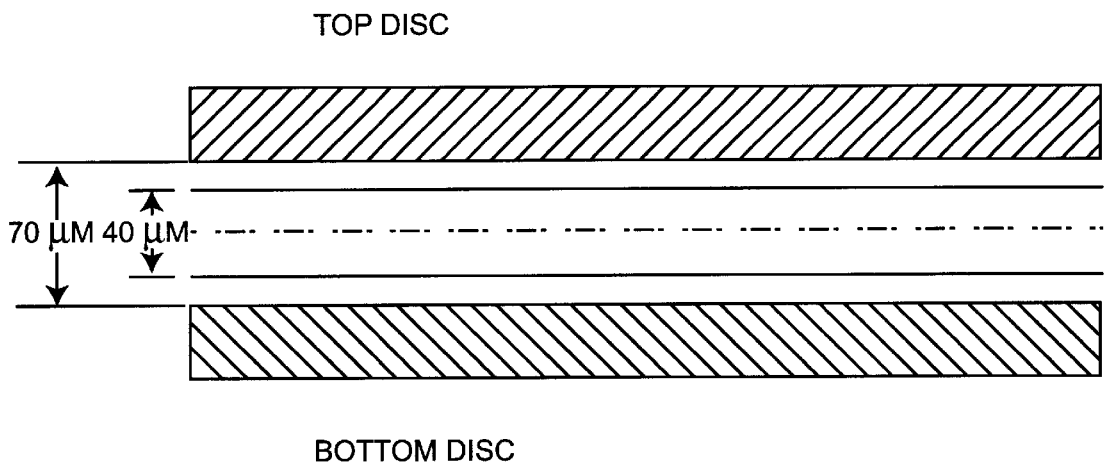
FIG. 1 is a schematic representation illustrating the lateral requirements of a DVD bonding layer.
Figure 2:
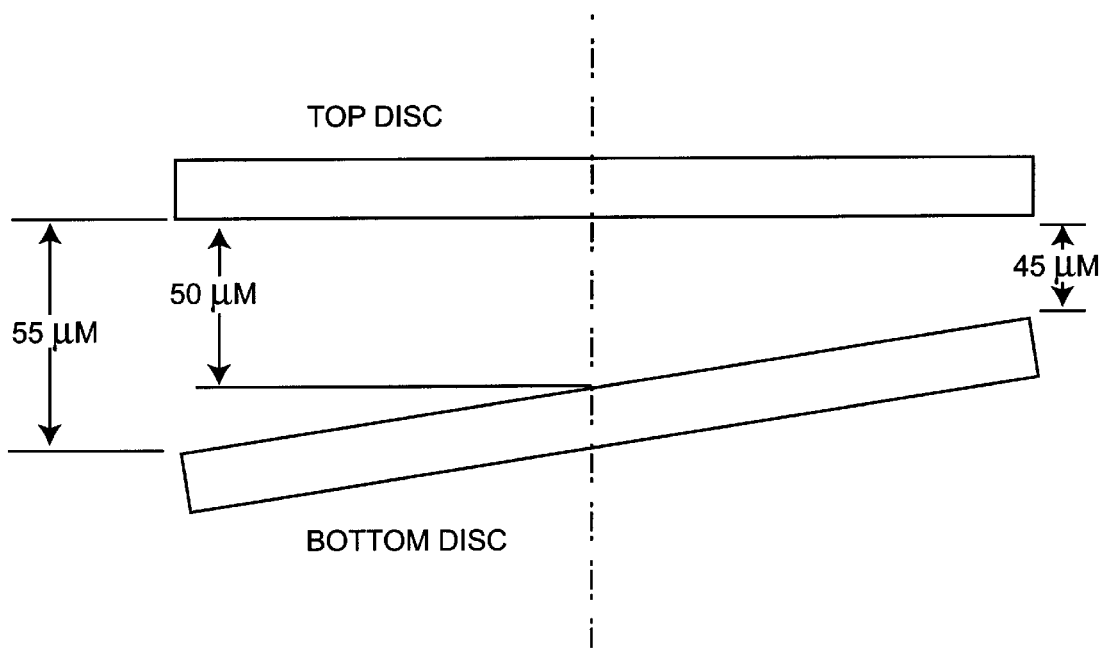
FIG. 2 is a schematic representation illustration the parallelism requirements of a DVD bonding layer.
Figure 3:
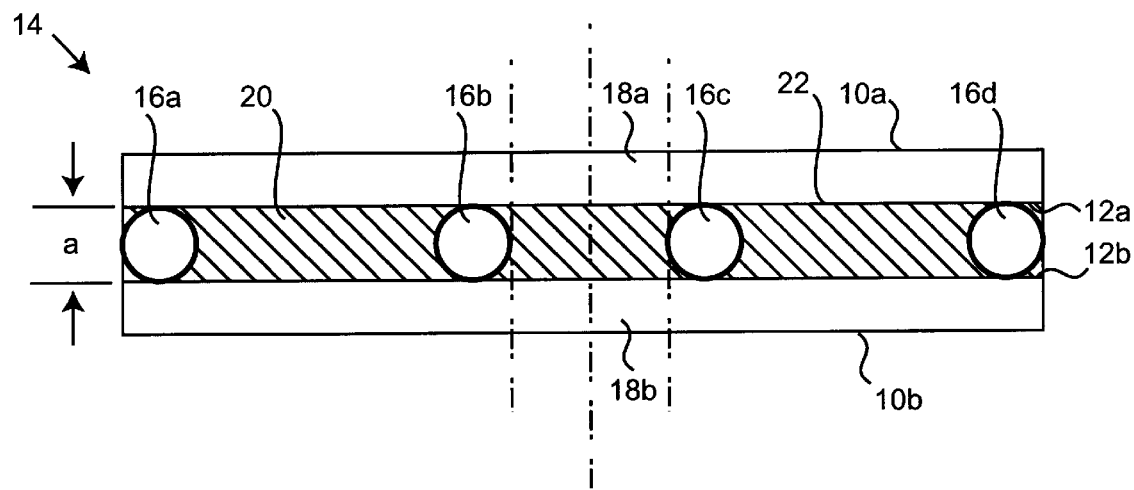
FIG. 3 is a front elevational view illustrating a preferred embodiment of an optical storage apparatus which is formed by the method for controlling the bonding layer thickness between facing surfaces of two optical discs in accordance with the teachings of the present invention.

The present invention relates to a method for controlling the bonding layer thickness of an optical disc apparatus, specifically a DVD-9 disc. As is show in FIG. 3, the present invention generally relates to a method for controlling the bonding layer thickness between facing surfaces 12a and 12b of two optical discs 10a and 10b which form an optical storage apparatus 14 when combined together. In the preferred embodiment, the optical storage apparatus is a DVD optical disk, and more particularly a DVD-9 optical disk.

In order to keep the bonding layer thickness within the aforementioned required lateral and parallelism specifications for a DVD bonding layer, relatively small microspheres, such as 16a, 16b, 16c and 16d, of a predetermined uniform diameter are selectively placed between the facing surfaces 12a and 12b of the respective optical discs 10a and 10b to obtain a uniform thickness of the bonding layer region 22 of the optical storage apparatus 14. In the preferred embodiment and in order to meet the lateral and parallelism requirements for a DVD-9 disc, these microspheres are approximately 50 $\mu$m. The material utilized for the microspheres can be any substance that can be manufactured to the size and tolerance of the DVD bonding layer specification. As an example, the material for the microspheres can be a copolymer of Divinylbenzene and Polystyrene. Glass is also a commonly used compound.

In addition, a bonding material 20 is applied in the bonding layer region 22 between the facing surfaces 12a and 12b of the respective optical discs 10a and 10b which is not occupied by the microspheres, such as 16a–d. Therefore, when pressure is applied to the non-facing surfaces 18a and 18b of the respective optical discs 10a and 10b, the discs will compress until they contact the microspheres 16a–d forming a uniform thickness of the bonding layer 22 between the discs of approximately 50 $\mu$m upon curing of the bonding material.

Any material intended to provide bonding between the two discs can be used. The bonding material can be, but is not limited to, an adhesive or a photopolymer. The chosen material must possess similar optical properties to the substrate. Properties include, but are not limited to, refractive index. As but an example, two photopolymer products, DIC number 661 and a Three Bond product TB-3077 have been used as the bonding material.

When a DVD-9 disc is inserted into a player, a laser beam must be able to "read" the top or bottom side of the disc as needed. Therefore, the bonding material 20 must be an optically clear material. Furthermore, the microspheres 16a–16b must not interfere with the laser as the differences in refractive indexes of the materials will cause errors in reading. As a result, the microsphere 16a–d are selectively placed so that they are not positioned in the program or information area of the disc, thus eliminating any interference effects.

Figure 4:
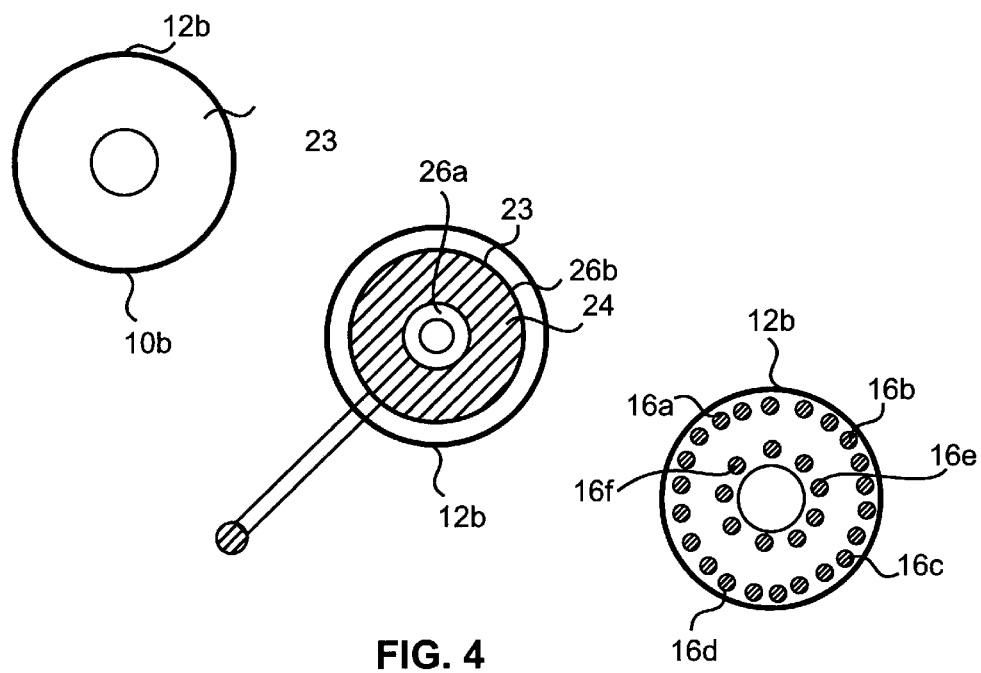
FIG. 4 is a top elevational view illustrating certain steps in a preferred embodiment of the method for controlling the bonding layer thickness between facing surfaces of two optical discs in accordance with the teachings of the present invention.

In the method for controlling the bonding layer thickness of an optical storage apparatus of the present invention, the microspheres are mixed ultrasonically with an inert aerosol propellant to keep them from clumping when applied. In addition, as shown in FIG. 4, one of the optical discs 10b is placed upon a working platform. In order that the microspheres are not placed in the information area 23 of the disc, the information area 23 of the facing surface 12b of the disc 10b is masked off by a plate 24 that extends immediately above the disc 10b so that the microspheres do not come in contact with the information area. Therefore, only the inside and outside non-information bearing regions 26a and 26b of the disc 10b will contain the microspheres. Moreover, in order to retain the aesthetic qualities of the disc, clear microspheres are preferably utilized. The microspheres, such as 16a–d, are sprayed onto the inside and outside non-information bearing regions 26a and 26b of the disc with an inert aerosol propellant, so that the microspheres are selectively placed only onto these regions 26a and 26b on one side 12b of the disc 10b so masked. The bonding material 20 is then applied to the facing surface 12a of the other optical disc 10a. Prior to applying pressure, the plate 24 is removed from the information area 23 of the facing surface 12b of the optical disc 10b. Thereafter, pressure is applied to the non-facing surfaces 18a and 18b of the two optical discs 10a, 10b to thereby form a substantially uniform thickness of the bonding layer 22 between the two optical discs 10a and 10b upon curing of the bonding material 20. The pressure is not released until the bonding material is completely cured. In the preferred embodiment, in order to cure while pressure is being applied, the pressed plattens are transparent and extremely flat.

As a result of the present invention, an optical storage apparatus, such as a DVD disc, is formed which includes two optical discs 10a and 10b which have a plurality of microspheres of uniform diameter selectively placed therebetween to provide a uniform thickness of the bonding layer 22 between the optical discs. In the preferred embodiment, the microspheres, such as 16a–16b, are transparent and are approximately 50 $\mu$m in diameter.

As a result of the present invention, a more controlled bonding layer thickness is obtained which is not dependent upon other processes. In addition, the bonding layer thickness remains consistent across the entire disc and does not vary with respect to the pressure being applied thereto. Moreover, the present invention satisfies the lateral and parallelism requirements necessary for manufacturing a DVD-9 optical disc.

While the present invention has been shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. An optical storage apparatus comprising two optical discs having a plurality of microspheres of uniform diameter selectively placed therebetween to thereby provide a uniform bonding layer between the two optical discs wherein said microspheres are selectively placed in non-information bearing regions of the facing surfaces of the two optical discs.

2. The optical storage apparatus of claim 1 wherein said microspheres are transparent.

3. The optical storage apparatus of claim 1 wherein said microspheres are approximately 50 µm in diameter.

4. A method for controlling the bonding layer thickness between facing surfaces of two optical discs having information areas during manufacture of an optical storage apparatus, said method comprising the steps of:
   spraying a plurality of microspheres of a predetermined diameter on a facing surface of one of the optical discs by means of mixing the microspheres with an inert aerosol propellant;
   placing a bonding material on the facing surface of the other of the optical discs; and
   applying pressure to the two optical discs to form a substantially uniform thickness between the two optical discs upon curing of the bonding material.

5. The method for controlling the bonding layer thickness between facing surfaces of two optical discs of claim 1 wherein said microspheres are transparent.

6. The method for controlling the bonding layer thickness between facing surfaces of two optical discs of claim 1 wherein the microspheres are approximately 50 µm in diameter.

7. The method for controlling the bonding layer thickness between facing surfaces of two optical discs of claim 1 and further comprising the step of selectively placing the microspheres outside of the information area of the facing surface of one of the optical discs.

8. A method for controlling the bonding layer thickness between facing surfaces of two optical discs having information areas during manufacture of an optical storage disc, said method comprising the steps of:
   selectively placing a plurality of microspheres of a predetermined diameter on a facing surface of one of the optical discs;
   mixing the microspheres ultrasonically to avoid clumping when the microspheres are selectively placed on the facing surface of one of the optical discs;
   placing a bonding material on the facing surface of the other of the optical discs; and
   applying pressure to the two optical discs to form a substantially uniform thickness between the two optical discs upon curing of the bonding material.

9. The method for controlling the bonding layer thickness between facing surfaces of two optical discs of claim 8 wherein said bonding material is an optically clear material.

10. A method for controlling the bonding layer thickness between facing surfaces of two optical discs having information areas during manufacture of an optical storage disc, said method comprising the steps of:
    selectively placing a plurality of microspheres of a predetermined diameter on a facing surface of one of the optical discs;
    masking the information area of the facing surface of the optical disc on which the microspheres are to be applied with a plate so that the microspheres do not come into contact with the information area of the said masked optical disc;
    placing a bonding material on the facing surface of the other of the optical discs; and
    applying pressure to the two optical discs to form a substantially uniform thickness between the two optical discs upon curing of the bonding material.

11. The method for controlling the bonding layer thickness between facing surfaces of two optical discs of claim 10 and further comprising the step of removing the mask from the said information area prior to said application of pressure step.

12. A method for controlling the bonding layer thickness between facing surfaces of two optical discs having information area during manufacture of an optical storage apparatus, said method comprising the step of selectively placing a plurality of microspheres of a predetermined diameter on a facing surface of one of the optical discs to form a substantially uniform thickness between the two optical discs forming the optical storage apparatus; and spraying the microspheres on the facing surface of one of the optical discs by means of mixing the microspheres with an inert aerosol propellant.

13. The method for controlling the bonding layer thickness between facing surfaces of two optical discs of claim 12 wherein said microspheres are transparent.

14. The method for controlling the bonding layer thickness between facing surfaces of two optical discs of claim 10 wherein the microspheres are approximately 50 µm in diameter.

15. A method for controlling the bonding layer thickness between facing surfaces of two optical discs having information area during manufacture of an optical storage apparatus, said method comprising the steps of selectively placing a plurality of microspheres of a predetermined diameter on a facing surface of one of the optical discs to form a substantially uniform thickness between the two optical discs forming the optical storage apparatus, and mixing the microspheres ultrasonically to avoid clumping when the microspheres are selectively placed on the facing surface of one of the optical discs.

16. A method for controlling the bonding layer thickness between facing surfaces of two optical discs having information area during manufacture of an optical storage apparatus, said method comprising the steps of selectively placing a plurality of microspheres of a predetermined diameter on a facing surface of one of the optical discs to form a substantially uniform thickness between the two optical discs forming the optical storage apparatus, and placing the microspheres in non-information bearing regions of the facing surface of one of the optical discs.

17. A method for controlling the bonding layer thickness between facing surfaces of two optical discs having information area during manufacture of an optical storage apparatus, said method comprising the steps of selectively placing a plurality of microspheres of a predetermined diameter on a facing surface of one of the optical discs to form a substantially uniform thickness between the two optical discs forming the optical storage apparatus, and masking the information area of the facing surface of the optical disc on which the microspheres are to be applied with a plate so that the microspheres do not come into contact with the information area of said masked optical disc.

18. A method for controlling the bonding layer thickness between facing surfaces of two optical discs having information areas during manufacture of an optical storage apparatus, said method comprising the steps of:
    masking the information area of the facing surface of one of the optical discs;
    ultrasonically mixing a plurality of microspheres of a predetermined uniform diameter;
    selectively placing the plurality of microspheres of a predetermined uniform diameter on the facing surface of the one said optical disc masked so that the microspheres are placed in non-information bearing regions of the facing surface of said masked optical disc;

placing a bonding material on the facing surface of the other of the optical discs;

removing the mask from the said information area of the one optical disc;

applying pressure to the two optical discs to form a substantially uniform thickness in the bonding layer between the two optical discs upon curing of the bonding material.

19. The method for controlling the bonding layer thickness between facing surfaces of two optical discs of claim 18 wherein said microspheres are transparent.

20. The method for controlling the bonding layer thickness between facing surfaces of two optical discs of claim 18 wherein said microscopes are approximately 50 µm in diameter.

21. The method for controlling the bonding layer thickness between facing surfaces of two optical discs of claim 18 wherein said bonding material is an optically clear material.

22. An optical storage apparatus comprising two optical discs having a plurality of microspheres of uniform diameter selectively placed and bonded therebetween with a bonding material to thereby provide a uniform bonding layer thickness between the two optical discs and wherein said microspheres are sprayed on at least one of the facing surfaces of the optical discs.

23. The optical storage apparatus of claim 22 wherein said bonding material is an optically clear material.

* * * * *